US010097290B2

(12) United States Patent
Oki

(10) Patent No.: US 10,097,290 B2
(45) Date of Patent: Oct. 9, 2018

(54) IN-TRAIN INFORMATION DISPLAY APPARATUS, IN-TRAIN INFORMATION DISPLAY SYSTEM, AND ADVERTISEMENT DISPLAY RESULT DETERMINING METHOD

(75) Inventor: Masao Oki, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 1320 days.

(21) Appl. No.: 14/002,208

(22) PCT Filed: Mar. 18, 2011

(86) PCT No.: PCT/JP2011/056573
§ 371 (c)(1),
(2), (4) Date: Aug. 29, 2013

(87) PCT Pub. No.: WO2012/127565
PCT Pub. Date: Sep. 27, 2012

(65) Prior Publication Data
US 2013/0339992 A1    Dec. 19, 2013

(51) Int. Cl.
H04H 20/14        (2008.01)
G06Q 30/02        (2012.01)
(Continued)

(52) U.S. Cl.
CPC ......... H04H 20/14 (2013.01); G06Q 30/0241 (2013.01); G06Q 30/0242 (2013.01);
(Continued)

(58) Field of Classification Search
CPC ........... H04N 21/812; H04N 21/23424; H04N 21/44016; H04N 21/44008; H04N 21/234;
(Continued)

(56) References Cited

U.S. PATENT DOCUMENTS 5,216,504 A    6/1993  Webb et al.
5,572,444 A   11/1996  Lentz et al.
(Continued)

FOREIGN PATENT DOCUMENTS

EP    1 079 605 A2    2/2001
EP    1 975 031 A2   10/2008
(Continued)

OTHER PUBLICATIONS

The extended European Search Report dated Jul. 25, 2014, by the European Patent Office in corresponding European Patent Application No. 11861689.5-1958. (9 pages).
(Continued)

Primary Examiner — Fonya M Long
Assistant Examiner — Rashida R Shorter
(74) Attorney, Agent, or Firm — Buchanan, Ingersoll & Rooney PC

(57) ABSTRACT

The present invention is an in-train information display apparatus that displays advertisement content to a passenger. The in-train information display apparatus includes a display unit configured to display the advertisement content, a display monitoring unit configured to photograph a video screen which is displayed on the display unit and actually seen from the passenger, and a display-result determining unit configured to calculate color-related information, which is information concerning a color of the video screen, based on an image photographed by the display monitoring unit and determine, based on the calculated color-related information and reference information for display result determination, which is information concerning a color of the advertisement content normally displayed on the display unit, whether the display of the advertisement content has been normally performed.

17 Claims, 4 Drawing Sheets

(51) Int. Cl.
  *H04N 21/414* (2011.01)
  *H04N 21/81* (2011.01)
  *H04N 21/214* (2011.01)
  *H04N 21/41* (2011.01)
  *H04N 21/422* (2011.01)
  *H04N 21/4223* (2011.01)
  *H04N 21/658* (2011.01)
  *G09G 3/36* (2006.01)
  *G06Q 50/30* (2012.01)
  *H04N 21/431* (2011.01)

(52) U.S. Cl.
  CPC ....... *G06Q 30/0272* (2013.01); *G09G 3/3611* (2013.01); *H04N 21/2146* (2013.01); *H04N 21/4122* (2013.01); *H04N 21/41422* (2013.01); *H04N 21/4223* (2013.01); *H04N 21/42202* (2013.01); *H04N 21/6582* (2013.01); *H04N 21/812* (2013.01); *G06Q 50/30* (2013.01); *G09G 2330/12* (2013.01); *G09G 2360/145* (2013.01); *G09G 2360/16* (2013.01); *G09G 2380/06* (2013.01); *H04N 21/4316* (2013.01)

(58) Field of Classification Search
  CPC ... H04N 21/44213; H04N 21/20; G06Q 30/02
  See application file for complete search history.

(56) References Cited

U.S. PATENT DOCUMENTS

| | | | |
|---|---|---|---|
| 5,602,932 | A | 2/1997 | Macdonald et al. |
| 6,880,082 | B2 | 4/2005 | Ohta |
| 7,764,280 | B2 | 7/2010 | Shiina |
| 8,305,224 | B2 | 11/2012 | Saito et al. |
| 8,621,384 | B2 | 12/2013 | Nagai |
| 8,766,877 | B2* | 7/2014 | Saito ............ B61D 49/00 345/1.2 |
| 9,584,233 | B2* | 2/2017 | Oki ............ G06Q 30/0241 |
| 2005/0110728 | A1 | 5/2005 | Cok |
| 2007/0132664 | A1 | 6/2007 | Weissman |
| 2008/0062164 | A1 | 3/2008 | Bassi et al. |
| 2008/0224966 | A1 | 9/2008 | Cok et al. |
| 2008/0237406 | A1 | 10/2008 | Saito et al. |
| 2008/0246781 | A1 | 10/2008 | Surati et al. |
| 2009/0009607 | A1 | 1/2009 | Dalgaard |
| 2009/0096938 | A1 | 4/2009 | Ouchi |
| 2009/0124387 | A1 | 5/2009 | Perlman et al. |
| 2009/0240590 | A1 | 9/2009 | Or et al. |
| 2010/0045681 | A1* | 2/2010 | Weissmueller, Jr. ............ G06Q 30/0241 345/501 |
| 2011/0095899 | A1 | 4/2011 | Saito et al. |
| 2011/0131522 | A1 | 6/2011 | Nagai |
| 2011/0157409 | A1 | 6/2011 | Adachi |
| 2012/0001029 | A1* | 1/2012 | Kondo ............ B61L 15/0027 246/108 |
| 2014/0152786 | A1* | 6/2014 | Nicholson ............ H04N 21/812 348/61 |

FOREIGN PATENT DOCUMENTS

| | | |
|---|---|---|
| JP | 9-210789 A | 8/1997 |
| JP | 2001-326952 A | 11/2001 |
| JP | 2003-122505 A | 4/2003 |
| JP | 2003-134489 A | 5/2003 |
| JP | 2005-057543 A | 3/2005 |
| JP | 2006-085522 A | 3/2006 |
| JP | 2007-019899 A | 1/2007 |
| JP | 2007-088980 A | 4/2007 |
| JP | 2007-295394 A | 11/2007 |
| JP | 2008-085685 A | 4/2008 |
| JP | 2009-075561 A | 4/2009 |
| WO | 2006/024698 A1 | 3/2006 |
| WO | 2006/089556 A1 | 8/2006 |
| WO | 2010/013507 A1 | 2/2010 |
| WO | WO 2010/024344 A1 | 3/2010 |

OTHER PUBLICATIONS

Wikipedia: "Dynamishe Fahrgastinformation", Internet Article, Jun. 26, 2010, Retrieved from the Internet: URL: http://de.wikipedia.org/w/index.php?title=Dynamische_Fahrgastinformation&oldid=76029043, XP055128141. (8 pages).
European Search Report dated Dec. 4, 2014 issued in corresponding European Patent Appln. No. 12760425.4 (6 pages).
Office Action (Communication pursuant to Article 94(3) EPC) dated Feb. 16, 2016, by the European Patent Office in corresponding European Patent Application No. 11861689.5. (7 pages).
International Search Report (PCT/ISA/210) dated Jun. 21, 2011, by the Japanese Patent Office as the International Searching Authority for International Application No. PCT/JP2011/056573.
Written Opinion (PCT/ISA/237) dated Jun. 21, 2011, by the Japanese Patent Office as the International Searching Authority for International Application No. PCT/JP2011/056573.
Notice of Rejection dated Oct. 4, 2011 by the Japanese Patent Office for Application No. 2011-532420 (English-language translation enclosed).
Koo, "Tokushu 'Kotsu System'", Mitsubishi Denki Giho, Nov. 2003, pp. 33-38, vol. 77, No. 11.
Sunami, "Tokushu 'Kotsu System'", Mitsubishi Denki Giho, Nov. 2003, pp. 39-42, vol. 77, No. 11.
Office Action (Communication pursuant to Article 94(3) EPC) dated Jul. 16, 2015, by the European Patent Office in corresponding European Patent Application No. 11 861 689.5-1958. (7 pages).
U.S. Office Action dated Jul. 6, 2016, by the U.S. Patent and Trademark Office in related U.S. Appl. No. 13/985,348 (22 pages).
European Official Communication dated Nov. 30, 2017 in corresponding European Patent Application 12 760 425.5-1901 (5 pages).

* cited by examiner

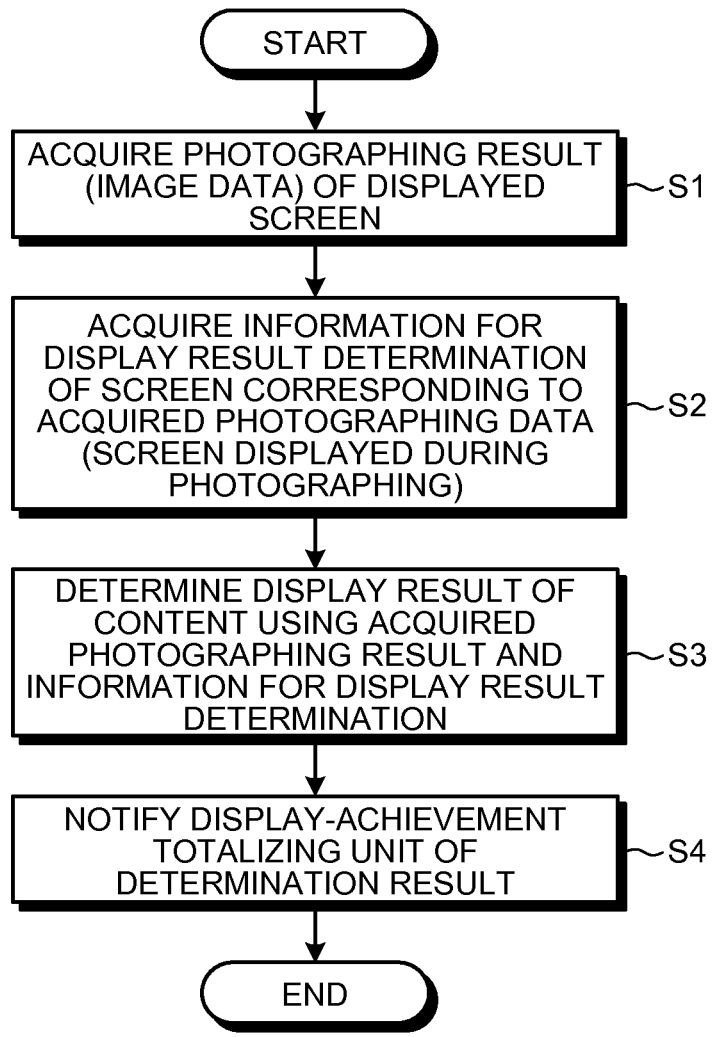

IN-TRAIN INFORMATION DISPLAY APPARATUS, IN-TRAIN INFORMATION DISPLAY SYSTEM, AND ADVERTISEMENT DISPLAY RESULT DETERMINING METHOD

FIELD

The present invention relates to an in-train information display apparatus, an in-train information display system, and an advertisement display result determining method for providing passengers with advertisement information.

BACKGROUND

In railway systems in recent years, a service for providing passengers with advertisement information including moving images and the like (hereinafter described as advertisement content) using display apparatuses set in cars of a train has been generally adopted.

In reproducing the advertisement content, a railway company performs the reproduction according to, for example, contents of an agreement with an advertiser. The agreement contents include, for example, a period and a time frame for providing passengers with the advertisement content and a total reproduction time and the number of times of reproduction of the advertisement content.

Taking into account the purpose of a company or the like to be an advertiser, i.e., the fact that the company or the like becomes the advertiser for the purpose of realizing profit improvement such as sales promotion of products of the company or the like, in order to accurately learn cost effectiveness of advertisement content provision to train passengers, it is desirable that achievement result such as date and time when the advertisement content is reproduced and the number of times of the reproduction is provided from the railway company to the advertiser. This is because, although the advertisement content is provided, when an expected effect is not obtained or when an effect fades in, the advertiser considers it necessary to take measures for, for example, changing details of the advertisement content or reviewing the agreement contents to change the time frame for reproducing the content and the number of times of the reproduction, a counter value to be paid, and the like.

Patent Literature 1 describes a technology for realizing effective commercial (advertisement content) broadcasting. According to the technology described in Patent Literature 1, a company charges an advertiser for broadcasting according to broadcasting achievement data of a broadcasted CM. Therefore, the advertiser can pay only a counter value for the actual broadcasting of a commercial and reduce useless expenditure.

CITATION LIST

Patent Literature

Patent Literature 1: Japanese Patent Application Laid-open No. 2003-134489.

SUMMARY

Technical Problem

However, in the technology in the past, identification information (a CM ID) of a commercial being broadcasted is displayed in a specific place of a video, the CM ID is detected, and the number of times of the broadcasting of the commercial is calculated. The number of times of the broadcasting is not calculated taking into account whether the commercial is normally broadcasted. That is, if the CM ID is detected, it is determined that the relevant commercial is correctly broadcasted. Therefore, there is a problem in that, if only the periphery of the place where the CM ID is present is correctly displayed, the commercial is treated as being normally broadcasted even if a display failure such as color unevenness occurs in other regions in the video.

The present invention has been devised in view of the above and it is an object of the present invention to obtain an in-train information display apparatus, an in-train information display system, and a display result determining method for highly accurately determining a display result of advertisement content and collecting highly reliable display achievement data.

Solution to Problem

In order to solve the aforementioned problems, an in-train information display apparatus that displays advertisement content to a passenger, the in-train information display apparatus comprising: a display unit configured to display the advertisement content; a camera configured to photograph a video screen displayed on the display unit and actually seen from the passenger; and a display-result determining unit configured to calculate color-related information, which is information concerning a color of the video screen, based on an image photographed by the camera and determine, based on the calculated color-related information and reference information for display result determination, which is information concerning a color of the advertisement content normally displayed on the display unit, whether the display of the advertisement content has been normally performed.

Advantageous Effects of Invention

According to the present invention, the in-train information display apparatus determines, using information calculated based on a photographed image of an advertisement content screen actually displayed to passengers, whether display of advertisement content is normally performed.

Therefore, there is an effect that it is possible to obtain highly reliable display achievement data.

BRIEF DESCRIPTION OF DRAWINGS

FIG. 4 is a flowchart for explaining an example of a determination operation by a display-result determining unit.

FIG. 5 is a diagram of an example of a method of dividing a display screen.

DESCRIPTION OF EMBODIMENTS

Embodiments of an in-train information display apparatus, an in-train information display system, and a display result determining method according to the present invention are explained in detail below based on the drawings. The present invention is not limited by the embodiments.

First Embodiment.

Figure 1:
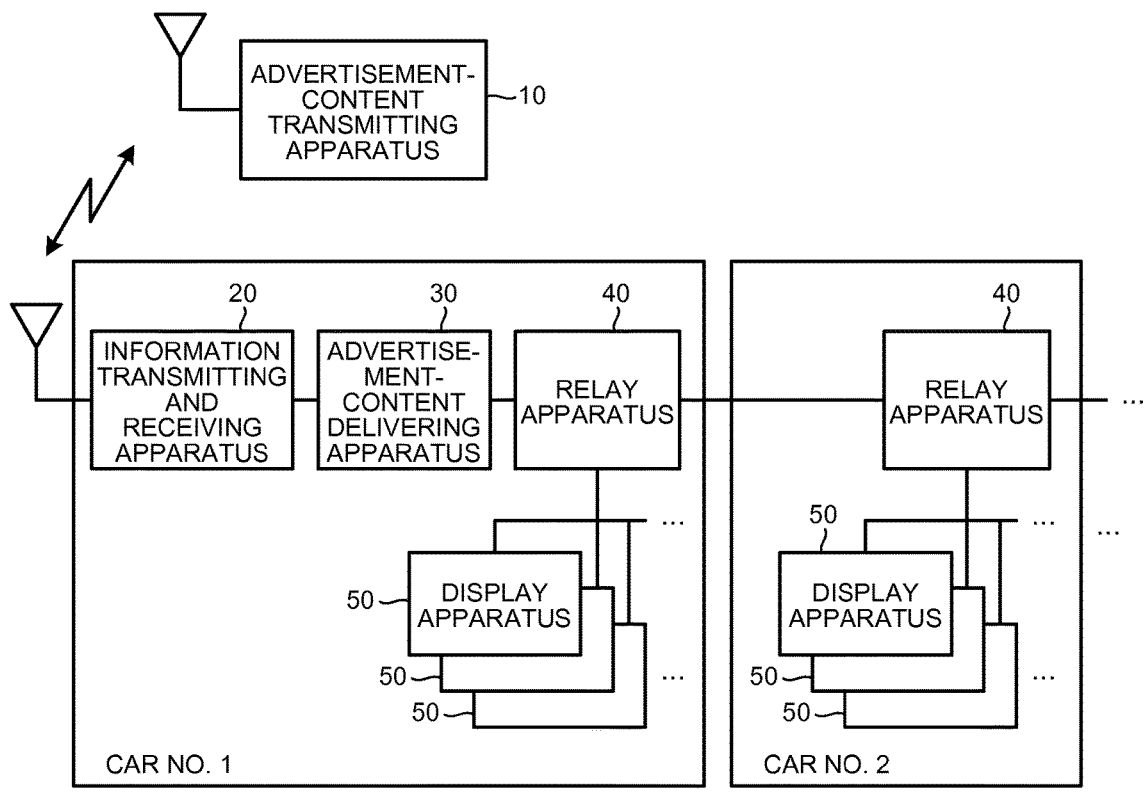
FIG. 1 is a diagram of a configuration example of a first embodiment of an in-train information display system according to the present invention.

FIG. 1 is a diagram of a configuration example of a first embodiment of an in-train information display system according to the present invention. In this embodiment, the in-train information display system is explained assuming a train made up of a plurality of trains. However, the present invention can also be applied to a one-car train. In FIG. 1, two cars (a car No. 1 and a car No. 2) are shown. It is assumed that a car No. 3 and subsequent cars have the same configuration as the car No. 2.

As shown in FIG. 1, the in-train information display system in this embodiment includes, as a device set on the ground side, an advertisement-content transmitting apparatus 10 configured to deliver advertisement content data (details of which are explained below) to cars in a railway system. The in-train information display system includes, as apparatuses set in a train, an information transmitting and receiving apparatus 20, an advertisement content delivering apparatus 30, a relay apparatus 40, and a display apparatus 50. An antenna of the advertisement-content transmitting apparatus 10 is set in, for example, a station or a rail yard. Among the devices mounted on the train, the information transmitting and receiving apparatus 20 and the information content delivering apparatus 30 only have to be provided one each in one train (one train set) (naturally, the apparatuses can be provided in as a dual system in preparation for a failure). The relay apparatus 40 and the display apparatus 50 are set in each of cars. A plurality of the display apparatuses 50 are set per one car. The display apparatuses 50 are respectively set, for example, in lintel sections above doors.

In the in-train information display system in this embodiment, the advertisement-content transmitting apparatus 10 has stored therein advertisement content data including an advertisement content file provided from an advertiser or the like (actual data of advertisement content displayed on the display apparatus 50 and provided to passengers) and advertisement content display schedule information (hereinafter referred to as content display control information) created based on, for example, conditions of an agreement with the advertiser. The advertisement-content transmitting apparatus 10 delivers the stored advertisement content data to the display apparatuses 50 of trains of the railway system according to necessity. The advertisement-content transmitting apparatus 10 acquires display achievement data of advertisement content from the display apparatuses 50 of the trains and manages the display achievement data.

An example of an operation for delivering the advertisement content data to the trains is briefly explained. The advertisement-content transmitting apparatus 10 delivers a list of the stored advertisement content data (e.g., listed identification information of the advertisement content and update date and time of the data formed) to a train standing in a station or a rail yard. On the other hand, the train checks the received list and, if advertisement content data not received yet is present, requests the advertisement-content transmitting apparatus 10 for the delivery of the advertisement content data. The advertisement-content transmitting apparatus 10 delivers the requested advertisement content data to the train. The advertisement-content transmitting apparatus 10 can store in advance which advertisement content data is already delivered to which trains in the railway system and, when a train stops in the station or the rail yard, if advertisement content data not delivered to the train is present, deliver the undelivered advertisement content data to the train. It is also possible that a standing train transmits a retained advertisement content data list to the advertisement-content transmitting apparatus 10 and the advertisement-content transmitting apparatus 10 checks the list and delivers necessary advertisement content data (undelivered advertisement content data) to the train.

The content display control information can be created for each one advertisement content file or can be created for each plurality of advertisement content files. That is, in the former case, content display control information associated with one advertisement content file is present (the advertisement content file and the content display control information are associated in a one-to-one relation. The content display control information includes, for example, display (reproduction) start time information of the advertisement content file corresponding thereto. In this case, when the display start time indicated by the content display control information comes, the display apparatus 50 reproduces advertisement content corresponding thereto. In the latter case (content display control information is created for each plurality of advertisement content file), the content display control information includes, for example, display order information and display start time information of the advertisement content files associated therewith. In this case, when display start time indicated by the content display control information comes, the display apparatus 50 reproduces, in order indicated by the display order information, advertisement contents associated therewith. In both the cases, the content display control information could sometimes indicate a plurality of display start times. The configuration of the content display control information is not limited to the above. The content display control information can have any configuration as long as the train can grasp reproduction start timing of advertisement content associated therewith. As a specific example, the content display control information can include a display start position (e.g., information indicating in which position of which route of a traveling train the display is started) instead of the display start time.

The information transmitting and receiving apparatuses 20 mounted on the trains perform reception of advertisement content data, transmission of display achievement information of advertisement content, and the like by communicating with the advertisement-content transmitting apparatus 10.

The advertisement-content delivering apparatus 30 stores in advance advertisement content data received from the advertisement-content transmitting apparatus 10 via the information transmitting and receiving apparatus 20 and delivers the stored advertisement content data to the display apparatuses 50 at predetermined timing. The advertisement-content delivering apparatus 30 totalizes display achievements of advertisement content in the display apparatuses 50 and transmits the display achievements to the ground side (the advertisement-content transmitting apparatus 10).

Upon receiving the advertisement content data transmitted from the advertisement-content delivering apparatus 30, the relay apparatus 40 relays the advertisement content data to the display apparatuses 50 set in an own car (a car in which the relay apparatus 40 is set) and relays the advertisement content data to the other relay apparatuses 40 set in cars adjacent to the own car. When advertisement content display achievements are transmitted from the display apparatuses 50, the relay apparatus 40 relays the advertisement content display achievements to the advertisement-content delivering apparatus 30.

The display apparatus 50, which is an in-train information display apparatus, retains the advertisement content data received from the advertisement content delivering apparatus 30 through the relay apparatus 40, reproduces an advertisement content file at the timing conforming to content display control information included in the advertisement content data, and provides passengers with advertisement content.

Figure 2:
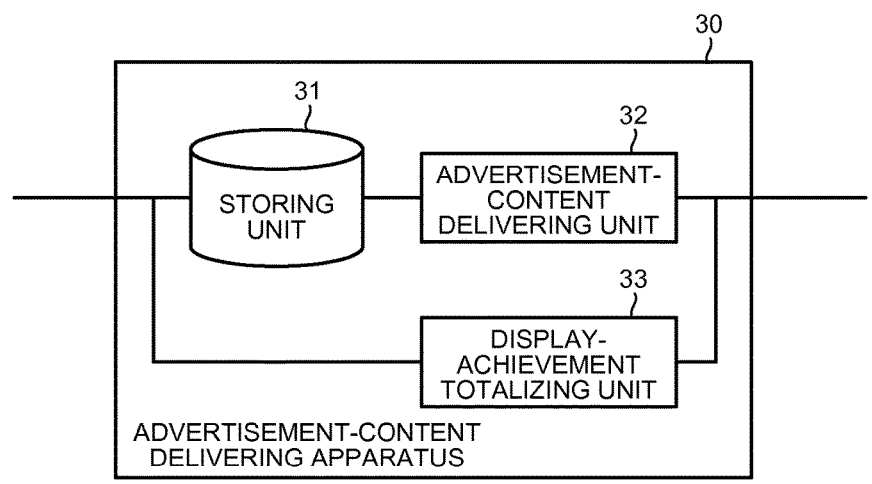
FIG. 2 is a configuration example of an advertisement content delivering apparatus.

FIG. 2 is a diagram of a configuration example of the advertisement content delivering apparatus 30. The advertisement content delivering apparatus 30 in this embodiment includes a storing unit 31, an advertisement-content delivering unit 32, and a display-achievement totalizing unit 33.

The storing unit 31 stores advertisement content data transmitted from the advertisement-content transmitting apparatus 10 and received by the information transmitting and receiving apparatus 20. The storing unit 31 may be provided as a redundant configuration (a dual system) for the purpose of improving reliability of the system.

The advertisement-content delivering unit 32 delivers the advertisement content data stored in the storing unit 31 to the display apparatuses 50 of the cars at predetermined timing. For example, the advertisement-content delivering unit 32 checks content display control information in the advertisement content data. If the content display control information includes information concerning reproduction start time of advertisement content, the advertisement-content delivering unit 32 delivers the advertisement content data at the timing a predetermined time before the reproduction start time. That is, the advertisement-content delivering unit 32 delivers the advertisement content data to the display apparatuses 50 before the reproduction start time.

The advertisement-content delivering unit 32 can process the content display control information in the advertisement content data according to necessity and then deliver the advertisement content data. For example, when the content display control information is created for each plurality of advertisement content files, the advertisement-content delivering unit 32 can generate a plurality of kinds of new content display control information from original content display content information such that one kind of content display control information is present for one advertisement content file (i.e., an advertisement content file and content display control information are in a one-to-one relation) and deliver the generated new content display control information instead of the original content display control information.

The display-achievement totalizing unit 33 collects display results of the advertisement content (results of determination concerning whether reproduction is normally performed) from the display apparatuses 50 and calculates a display achievement in the own car. The display-achievement totalizing unit 33 can calculate the display achievement using a log file including information such as display time, a display content file name, and the number of times of display. The display-achievement totalizing unit 33 calculates, when the operation of the train ends, the number of times of reproduction execution and the number of times of reproduction success (or the number of times of failure) for each advertisement content. The display-achievement totalizing unit 33 can use, as the display achievement, a result obtained by dividing the number of times of reproduction success by the number of times of execution (a reproduction success ratio based on the number of times of reproduction) or a result obtained by dividing a reproduction success time by a reproduction execution time (a reproduction success ratio based on a reproduction time). For example, the display-achievement totalizing unit 33 can calculate a display achievement for each car and for each display content or calculate a display achievement for each display apparatus and for each display content. Display timing may be the timing other than the operation end time. When the calculation of the display achievement ends, the display-achievement totalizing unit 33 notifies the ground side (the advertisement-content transmitting apparatus 10) of a calculation result.

Figure 3:
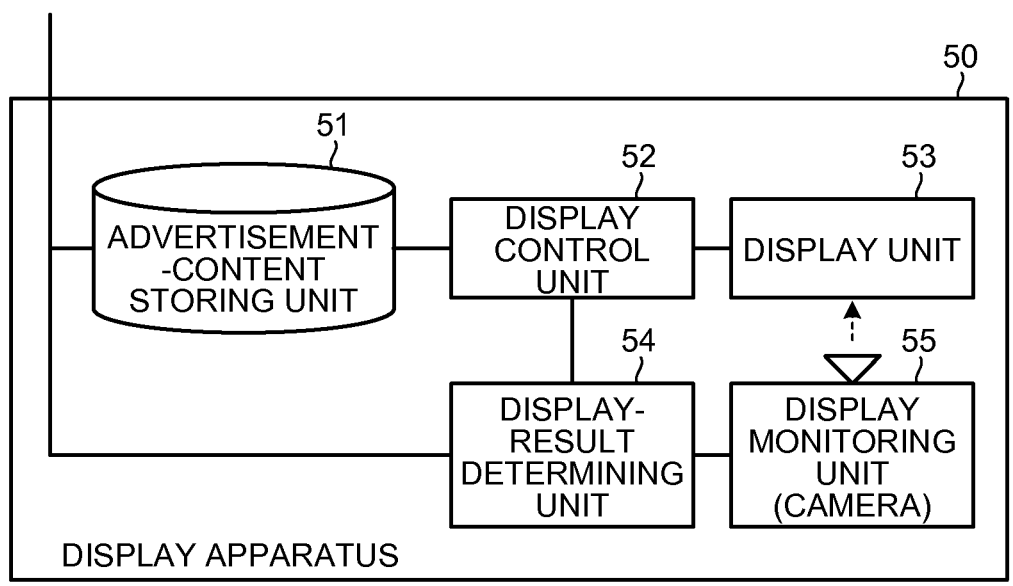
FIG. 3 is a diagram showing a configuration example of a display apparatus.

FIG. 3 is a diagram of a configuration example of the display apparatus 50. The display apparatus 50 in this embodiment includes an advertisement-content storing unit 51, a display control unit 52, a display unit 53, a display-result determining unit 54, and a display monitoring unit 55.

The advertisement-content storing unit 51 stores advertisement content data delivered from the advertisement-content delivering apparatus 30 via the relay apparatus 40. In this embodiment, it is assuming that a storage capacity of the advertisement-content storing unit 51 is extremely smaller than a storage capacity of the storing unit 31 of the advertisement-content delivering apparatus 30, and that advertisement content data of advertisement content displayed on the display apparatus 50 is delivered from the advertisement-content delivering apparatus 30 shortly before display start time. It is also assumed that the advertisement content data stored in the advertisement-content storing unit 51 is deleted when display ends. Naturally, the storage capacity of the advertisement-content storing unit 51 can be equal to or larger than the storage capacity of the storing unit 31 of the advertisement-content delivering apparatus 30 and the advertisement control data can be left without being deleted after the display ends.

The display control unit 52 reads out an advertisement content file to be reproduced according to reproduction start timing (reproduction start time) specified by content display control information included in the advertisement content data stored in the advertisement-content storing unit 51 and generates a screen for an advertisement content to be displayed on the display unit 53.

The display unit 53 displays the advertisement content screen generated by the display control unit 52.

The display-result determining unit 54 determines, based on the advertisement content screen generated by the display control unit 52 and an image photographed by the display monitoring unit 55 explained below, whether display of the advertisement content on the display unit 53 is normally performed. The display-result determining unit 54 notifies the display-achievement totalizing unit 33 of the advertisement-content delivering apparatus 30 of a determination result (a display result of the advertisement content).

The display monitoring unit 55 is a camera (an image pickup device). The display monitoring unit 55 photographs a screen (a video screen for advertisement content) displayed on the display unit 53 and actually seen from the passengers and outputs a photographed image to the display-result determining unit 54. Photographing timing is, for example, a timing designated from the display-result determining unit 54.

Subsequently, a determining operation by the display-result determining unit 54 is explained in detail. FIG. 4 is a flowchart for explaining an example of the determining operation by the display-result determining unit 54.

First, the display-result determining unit 54 acquires, from the display monitoring unit 55, an image obtained by photographing the display screen of the display unit 53 (step S1).

At step S1, the display-result determining unit 54 instructs the display monitoring unit 55 to photograph the display screen of the display unit 53 and acquires, from the display monitoring unit 55, an image photographed as a result of the instruction. The display-result determining unit 54 determines the photographing timing and instructs the display monitoring unit 55 to photograph the display screen at the determined timing.

Subsequently, the display-result determining unit 54 acquires, from the advertisement-content storing unit 51 or the advertisement-content delivering apparatus 30, information used in determining a display result of the acquired image (step S2).

The information acquired at step S2 is information concerning a color of the advertisement content screen displayed on the display unit 53 (e.g., information including one or more of kinds of information such as tint, hue, and brightness). More specifically, the information is information concerning a color for each pixel of a photographed image obtained when the display monitoring unit 55 photographs the display screen of the display unit 53 in a state in which advertisement content is normally displayed (information concerning a color of the screen photographed when the display is normally performed). For example, the display monitoring unit 55 only has to obtain the information (hereinafter referred to as reference information for display result determination) in advance by analyzing an image obtained by photographing a specific video screen displayed on the display unit 53 in a state in which the advertisement content is normally displayed on the display unit 53 (a photographed image obtained when the display is normal). The advertisement-content transmitting apparatus 10 on the ground side manages the reference information for display result determination obtained in this way and delivers the reference information for display result determination to the trains together with advertisement content data. In this case, in the reference information for display result determination, information indicating to which screen display of which scene of advertisement content corresponding thereto is included. This information is only has to be, for example, information concerning an elapsed time from the start of reproduction of the advertisement content.

The reference information for display result determination can also be calculated using an advertisement content file included in the advertisement content data. For example, the advertisement-content transmitting apparatus 10 only has to calculate the reference information for display result determination and deliver the reference information for display result determination to the trains together with the advertisement content data. In this case, as in the case explained above, in the reference information for display result determination, information indicating to which screen display of which scene of advertisement content corresponding thereto is included.

Two or more kinds of reference information for display result determination (reference information for display result determination concerning two or more specific video screens different from one another) can be calculated for one advertisement content and delivered to the trains. The reference information for display result determination can be calculated in the train. That is, the advertisement-content delivering apparatus 30 can calculate the reference information for display result determination and transmit the reference information for display result determination together with advertisement content data corresponding thereto. The display control units 52 of the display apparatuses 50 can calculate the reference information for display result determination. Further, the display-result determining unit 54 itself can calculate the reference information for display result determination. When the display-result determining unit 54 calculates the reference information for display result determination by itself, the display-result determining unit 54 does not have to notify the display monitoring unit 55 of photographing timing at step S1. That is, the display monitoring unit 55 can be configured to perform, upon receiving a photographing instruction, photographing at arbitrary timing and output information concerning the photographing timing (photographing time) to the display-result determining unit 54 together with a photographed image. In this case, the display-result determining unit 54 calculates the reference information for display result determination by, for example, acquiring, from the display control unit 52, data related to screen display displayed by the display unit 53 at timing indicated by the received photographing timing information.

The execution order of the processing at steps S1 and S2 can be the other way round. When the processing at step S2 is executed first, in the photographing instruction to the display monitoring unit 55, the display-result determining unit 54 instructs the display monitoring unit 55 to photograph the screen corresponding to the reference information for display result determination at the timing when the display unit 53 displays the screen.

Subsequently, the display-result determining unit 54 determines a display result of the advertisement content using the image acquired at step S1 and the reference information for display result determination acquired (or calculated) at step S2 (step S3).

At step S3, the display-result determining unit 54 analyzes the image acquired at step S1 and calculates information concerning a color of the photographed display screen. The information to be calculated is information of a type same as the reference information for display result determination (the information including one or more of kinds of information such as tint, hue, and brightness). The display-result determining unit 54 compares the calculated information and the reference information for display result determination acquired at step S2 and determines whether the display of the advertisement content has been normally performed. That is, when the calculated information and the reference information for display result determination are substantially the same, the display-result determining unit 54 determines that the display has been normally performed.

An example of a comparison method in image analysis is explained. As the comparison of the information concerning a color of the photographed display screen and the reference information for display result determination, ideally, it is desirable to compare bit information of each one pixel. However, in this case, a processing load is made large. Therefore, the display-result determining unit 54 can divide the display screen into a plurality of regions and perform the analysis for each of the regions (calculate the information concerning a color for each of the regions). In this case, the display-result determining unit 54 divides the display screen into three in each of the lengthwise and the crosswise of the display screen as shown in FIG. 5 and calculates the information concerning a color for each of nine regions. The display-result determining unit 54 calculates the relation among magnitudes of values of the information in the respective regions. The magnitude relation is, for example, the order of the magnitudes of values of the respective kinds of information (information concerning a color) and is information indicating the order of largeness (or smallness) of the values of the information in the regions. Therefore, in this case, the reference information for display result determination is also information indicating the order of largeness of the values of the information (the information concerning a color) in each of the divided regions. When the order of largeness of the value for each of the regions calculated by analyzing the image and the order of largeness of the value for each of the regions indicated by the reference information for display result determination coincide with each other, the display-result determining unit 54 determines that the display has been normally performed. Rather than performing the determination using the magnitude relation of the values of the information in the respective regions, the display-result determining unit 54 can calculate color histograms in the regions, compare the color histograms of the regions with reference information for display result determination (the reference information for display result determination in this case is generated for each of a plurality of regions divided under the condition same as the conditions for the display screen), and perform the determination. If the calculated color histograms and the reference information for display result determination are substantially the same in all the regions, the display-result determining unit 54 determines that the display has been normally performed. The number of divisions does not have to be fixed. For example, the number of divisions can be different for each advertisement content. The number of divisions only has to be increased when it is desired to further improve determination accuracy.

When step S3, i.e., the determination of the display result of the advertisement content ends, the display-result determining unit 54 notifies the display-achievement totalizing unit 33 of the advertisement-content delivering apparatus 30 of a determination result (step S4). At this point, the display-result determining unit 54 notifies information concerning time when the determination is carried out, identification information of the advertisement content for which the determination is performed, identification information of the own apparatus (the display apparatus that performs notification of the result), and the like as well.

The display-result determining unit 54 periodically carries out the processings at steps S1 to S4. Timing (interval) for carrying out the processings can be variable. It is anticipated that a failure occurs in the apparatuses configuring the in-train information display system according to aged deterioration of a component (e.g., a backlight of the display unit 53) and the display of the advertisement content is not correctly performed. Therefore, for example, the interval for carrying out the processing can be reduced as an elapsed time (or a cumulative use time) from the start of the use of the display unit 53 increases. Consequently, time from occurrence of a display abnormality due to a failure of the display unit 53 or the like until detection of the display abnormality is reduced. Therefore, it is possible to obtain an accurate display achievement.

In notifying the display-achievement totalizing unit 33 of the determination result at step S4, the display-result determining unit 54 can detect the number of passengers present around the own apparatus (the display apparatus 50) and notify the detected number of passengers as well. The effect obtained by providing the advertisement content (e.g., profit improvement of an advertiser) considerably depends on the number of passengers looking at the advertisement content. Therefore, by notifying the number of passengers as well, the display-achievement totalizing unit 33 can calculate information more useful when the advertiser determines cost effectiveness of advertisement content provision, for example, corrects a display achievement according to the number of passengers. The detection of the number of passengers can be performed using the display monitoring unit 55. That is, the display monitoring unit 55 photographs the periphery of the own display apparatus 50 at any timing of a time frame in which the display screen of the display unit 53 is not photographed (timing as close as possible to timing for photographing the display screen of the display unit 53 is desirable). The display-achievement totalizing unit 33 detects the number of passengers by analyzing a photographed image. When it is possible to discriminate whether the passengers are actually looking in the direction of the display apparatus 50 by the analysis of the photographed image, the number of passengers looking in the direction of the display apparatus 50 can be detected. Further, when the sex, the rough age, and the like of the passengers can be discriminated, detection thereof can be carried out together with the detection of the number of passengers (or the number of passengers looking in the direction of the display apparatus 50).

When only the determination result is notified from the display-result determining unit 54 (when the number of passengers is not notified), the display-achievement totalizing unit 33 can correct a display achievement according to a car occupancy of each of the cars. The car occupancy can be acquired from a train information managing apparatus not shown in the figure. The train information managing apparatus manages a car occupancy of each of the cars calculated based on, for example, car weight indicated by AS pressure (air spring pressure).

As explained above, in the in-train information display system in this embodiment, a display screen in a state in which advertisement content is normally displayed (a normal display screen) is photographed and information concerning a color of the normal display screen (e.g., information including one or more of kinds of information such as tint, hue, and brightness) is calculated in advance based on a photographed image obtained as a result of the photographing and retained as reference information for display result determination. The display apparatus 50 analyzes an image obtained by photographing a display screen for advertisement content actually displayed to the passengers (a photographed image of the display screen) to calculate information concerning a color of the display screen and compares the calculated information with the reference information for display result determination to thereby determine whether display of the advertisement content has been normally performed. Consequently, it is possible to highly accurately determine a display result of the advertisement content (whether the advertisement content has been normally displayed) and obtain highly reliable display achievement data.

In reproducing the advertisement content, the display apparatus 50 can insert, halfway in the advertisement content, a video for screen display state check having length (a reproduction time) unrecognizable by the passengers and determine a display result of the advertisement content data using a photographing result of the video for screen display state check. In this case, for example, the advertisement-content transmitting apparatus 10 creates an advertisement content file, in which the video for screen display state check is inserted, and information concerning a color of a screen of the video for screen display state check (reference information for display result determination) and delivers the advertisement content file and the information to the trains as advertisement content data together with information indicating an inserting position of the video for screen display state check. When the advertisement content file, in which the video for screen display state check is inserted, is reproduced, the display apparatuses 50 of the trains determine a display result of the advertisement content using the photographing result of the video for screen display state check.

In the display apparatus 50 in this embodiment, the display monitoring unit 55 photographs the display unit 53 of the own apparatus and the display-result determining unit 54 determines a display result in the own apparatus. However, the display monitoring unit can photograph the display unit 53 of another display apparatus 50 set on an opposite side (an opposed side) of a side where the own apparatus is set on the inner wall of the car. That is, the display-result determining unit 54 determines a display result in the other display apparatus 50 photographed by the display monitoring unit 55 in the own apparatus. The display-result determining unit 54 can acquire, from the other display apparatus 50, a photographed image of a screen displayed on the display unit 53 of the own apparatus and determine a display result in the own apparatus. When the display monitoring unit 55 photographs the display unit 53 of the other display apparatus 50, the display monitoring unit 55 can simultaneously photograph the display units 53 of a plurality of the display apparatuses 50 using, for example, a fish-eye lens. When the display monitoring unit 55 is configured to photograph the display unit 53 of the other display apparatus 50, the display apparatuses 50 set in the same car synchronize display timing of the advertisement content.

In this embodiment, a display result of the advertisement content is determined using a photographed image obtained by directly photographing the display screen using the camera functioning as image pickup means. However, for example, it is also possible that an optical reflector such as a reflecting mirror is set on the front wall surface of the display apparatus, a display screen of the own apparatus reflected on the reflecting mirror is photographed by, for example, the image pickup means provided in the own apparatus, and the display result of the advertisement content is determined using an obtained image.

Second Embodiment.

Figure 6:
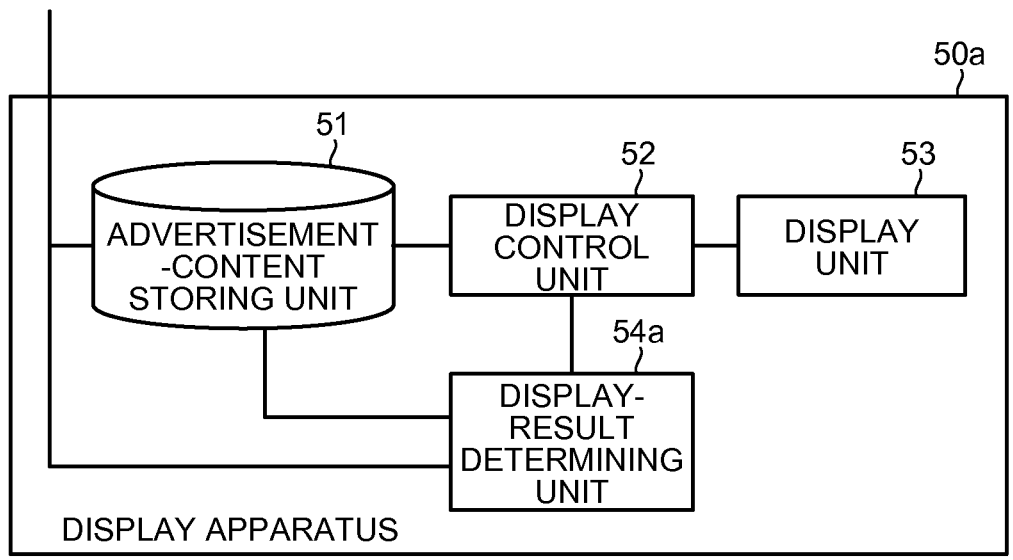
FIG. 6 is a diagram of a configuration example of a display apparatus in a second embodiment.

FIG. 6 is a diagram of a configuration example of a display apparatus in a second embodiment. A display apparatus 50a in this embodiment has a configuration in which the display monitoring unit 55 included in the display apparatus 50 (see FIG. 3) in the first embodiment has been removed and the display-result determining unit 54 has been replaced with a display-result determining unit 54a. In the display apparatus 50a in this embodiment, the display-result determining unit 54a compares advertisement content data stored by the advertisement-content storing unit 51 and advertisement content data stored by the advertisement-content delivering apparatus 30 to thereby determine whether advertisement content has been normally displayed.

In the in-train information display system, as explained in the first embodiment, the advertisement-content delivering apparatus 30 receives and stores in advance advertisement content data delivered from the advertisement-content transmitting apparatus 10 on the ground to the trains. The advertisement-content delivering apparatus 30 delivers the advertisement content data to the display apparatuses 50 in the train taking into account, for example, a display schedule (reproduction start time) of advertisement content. However, it is also probable that the advertisement content data is broken by noise or the like while being transmitted from the advertisement-content delivering apparatus 30 to the display apparatuses 50. In that case, the advertisement content is not normally displayed. For example, when an advertisement content file included in the advertisement content data is broken, it is likely that a part or all of a display screen for the advertisement content is not correctly displayed. Further, when content display control information is broken, it is likely that the advertisement content is not displayed at all. Therefore, the display apparatus 50a in this embodiment checks consistency of the advertisement content file delivered from the advertisement-content delivering apparatus 30 and stored by the advertisement-content storing unit 51 and the advertisement content data stored by the advertisement-content delivering apparatus 30 has been determines whether the advertisement content has been normally displayed.

When checking the consistency of the data, the display-result determining unit 54a calculates, for example, a checksum of the advertisement content data stored by the advertisement-content storing unit 51, acquires a checksum of advertisement content data same as the advertisement content data from the advertisement-content delivering apparatus 30, and compares the checksums. If the checksums coincide with each other as a result of the comparison, the display-result determining unit 54a determines that advertisement content corresponding to the advertisement content data (advertisement content displayed using the advertisement content data for which the checksums are calculated) has been normally displayed.

In the display apparatus 50a, the components other than the display-result determining unit 54a perform operations same as the operations of the components denoted by the same reference numerals in the display apparatus 50 in the first embodiment.

As explained above, in the display apparatus 50a in this embodiment, the display-result determining unit 54a determines, based on a comparison result of the advertisement content data delivered from the ground and stored by the advertisement-content delivering apparatus 30 and advertisement content data stored by the own display apparatus 50a, whether display of the advertisement content has been normally performed. Consequently, it is possible to determine a display result of the advertisement content and obtain display achievement data.

The display result determining operation explained in this embodiment can be carried out in the display apparatus 50 in the first embodiment. For example, first, the display-result determining unit checks whether the advertisement content data stored by the advertisement-content delivering apparatus 30 and the advertisement content data stored by the own display apparatus coincide with each other. When the advertisement content data coincide with each other, the display-result determining unit determines that delivery of the advertisement content data to the own apparatus has been normally performed and executes the determining operation (see FIG. 4) explained in the first embodiment using a photographing result by the display monitoring unit 55. Consequently, the display-result determining unit carries out the determining operation using a photographed image of a display screen only in a case in which the delivery of the advertisement content data to the display apparatus has been normally performed. Therefore, it is possible to reduce the number of times of execution of image analysis processing having a large processing load.

Third Embodiment.

Figure 7:
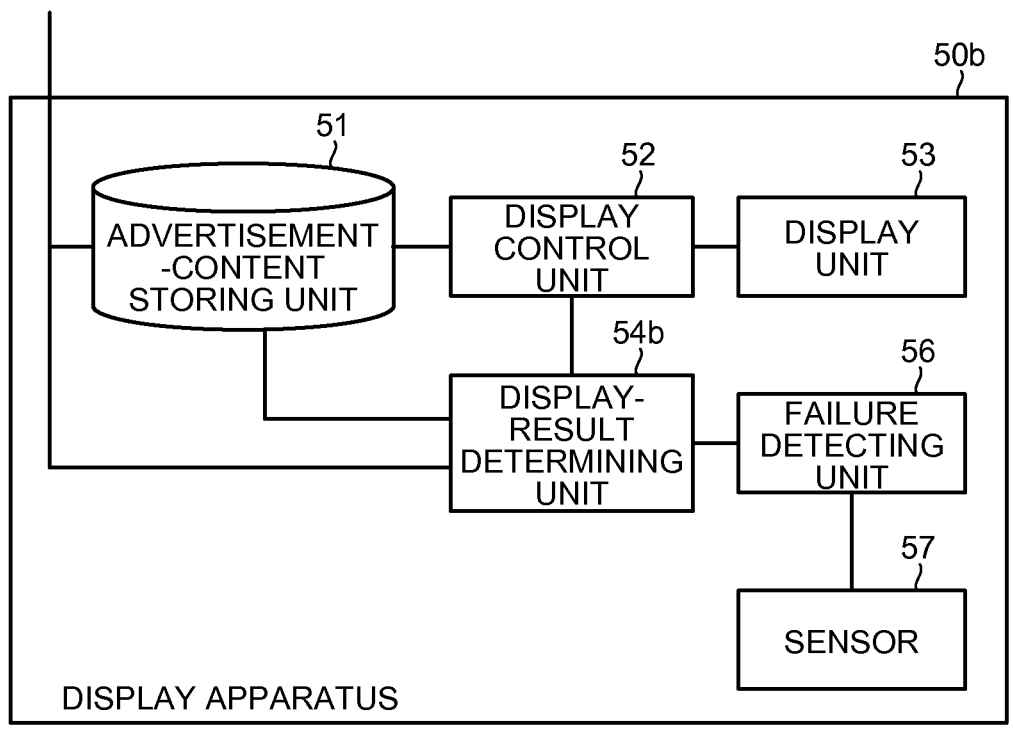
FIG. 7 is a diagram of a configuration example of a display apparatus in a third embodiment.

FIG. 7 is a diagram of a configuration example of a display apparatus in the third embodiment. A display apparatus 50b in this embodiment has a configuration in which the display monitoring unit 55 included in the display apparatus 50 in the first embodiment (see FIG. 3) is replaced with a failure detecting unit 56 and a sensor 57 and the display-result determining unit 54 is replaced with a display-result determining unit 54*b*. In the display apparatus 50*b* in this embodiment, the display-result determining unit 54*b* determines, based on a failure detection result by the failure detecting unit 56, whether advertisement content has been normally displayed.

The failure detecting unit 56 detects a failure of the display unit 53 using the sensor 57. For example, the failure detecting unit 56 uses the sensor 57 as a luminance sensor and, when the luminance of a screen displayed on the display unit 53 is equal to or lower than a specified threshold, determines that the display unit 53 is broken.

The threshold can be changed as appropriate according to an ambient environment of the display apparatus 50*b*. For example, the threshold is changed according to, for example, a time frame (day or night), weather, and a traveling position of a train (e.g., whether or not the train is in a tunnel). The sensor 57 can be a sensor for detecting a value of an electric current flowing in the display unit 53. For example, the sensor 57 detects a current value of a backlight or a driver current value and, if the failure detecting unit 56 determines that the current value detected by the sensor 57 is equal to or lower than a specified threshold, the failure detecting unit 56 determines that the display unit 53 is broken. Besides, the sensor 57 can be a sensor for detecting a signal level to a control board of the display unit 53, a sensor for detecting a power supply voltage supplied to the control board, or the like.

When a detection result by the failure detecting unit 56 indicates that a failure of the display unit 53 has been detected, the display-result determining unit 54*b* determines that advertisement content has not been normally displayed.

In the display apparatus 50*b*, the components other than the display-result determining unit 54*b*, the failure detecting unit 56, and the sensor 57 perform operations same as the operations of the components denoted by the same reference numerals in the display apparatus 50 in the first embodiment.

As explained above, in the display apparatus 50*b* in this embodiment, the display-result determining unit 54*b* determines, based on a detection result by the failure detecting unit 56 configured to detect, for example, a failure of the display unit 53 in the own apparatus, whether display of advertisement content is normally performed. Consequently, it is possible to determine a display result of the advertisement content and obtain display achievement data.

The display result determining operation explained in this embodiment can be carried out in the display apparatus 50 in the first embodiment. That is, the display apparatus 50 in the first embodiment further includes a failure detecting unit 56 and the sensor 57 explained in this embodiment. For example, when a detection result by the failure detecting unit 56 does not indicate failure detection for the display unit 53 (when the display unit 53 is normally operating), the display-result determining unit 54 executes the determining operation (see FIG. 4) explained in the first embodiment using a photographing result by the display monitoring unit 55. Consequently, only when the delivery of advertisement content data to the display apparatus has been normally performed, the determining operation is carried out a photographed image of a display screen. Therefore, it is possible to reduce the number of times of execution of image analysis processing having a large processing load.

Further, the display result determining operation explained in the second embodiment can be carried out in combination with the display result determining operation in this embodiment. That is, the display-result determining unit 54*b* checks whether advertisement content data stored by the advertisement-content delivering apparatus 30 and advertisement content data stored by the own display apparatus 50 coincide with each other (delivery of the advertisement content data to the own apparatus has been normally performed) and checks whether the failure detecting unit 56 has detected that the display unit 53 is normally operating. In a case in which the delivery of the advertisement content data is normally performed and the display unit 53 is normally operating, the display-result determining unit executes the determining operation explained in the first embodiment (see FIG. 4) using a photographing result by the display monitoring unit 55. Consequently, it is possible to reduce the number of times of execution of image analysis processing having a large processing load.

In the embodiments explained above, the components included in the advertisement-content delivering apparatus and the display apparatus can be arranged in the other apparatuses as appropriate within a range in which the realization of the operations and the like explained in the embodiments can be maintained. For example, in the examples explained in the embodiments, each of the display apparatuses includes the advertisement content storage device, the display control unit, and the result determining unit. However, it is also possible that the relay apparatus in each of the cars is configured to include a part or all of the units and the relay apparatus controls the display apparatuses in the own car to display advertisement content.

INDUSTRIAL APPLICABILITY

As explained above, the in-train information display apparatus according to the present invention is useful as an apparatus that provides passengers with advertisement content and is, in particular, suitable for an in-train information display apparatus having a display result determining function for the advertisement content.

REFERENCE SIGNS LIST

10 Advertisement-content transmitting apparatus
20 Information transmitting and receiving apparatus
30 Advertisement-content delivering apparatus
31 Storing unit
32 Advertisement-content delivering unit
33 Display-achievement totalizing unit
40 Relay apparatus
50, 50*a*, 50*b* Display apparatuses
51 Advertisement-content storing unit
52 Display control unit
53 Display unit
54, 54*a*, 54*b* Display-result determining units
55 Display monitoring unit (Camera)
56 Failure detecting unit
57 Sensor

The invention claimed is:

1. An in-train information display apparatus that displays, to a passenger, video of advertisement content delivered from an advertisement-content delivering apparatus, the in-train information display apparatus comprising:
   a display configured to display thereon the video of advertisement content, wherein said display is located in a car of a train that includes a plurality of cars;
   a camera configured to photograph a video screen which displays the video of advertisement content on the display; and
   a processor configured to
      calculate color-related information, which is information concerning a color for each pixel of the video screen, based on an image of the video screen photographed by the camera, determine, based on the calculated color-related information and reference information for display result determination, which is information concerning a color of the video of advertisement content normally displayed on the display, whether the display of the video of advertisement content has been normally performed, and transmit a result of the determination to the advertisement-content delivering apparatus, wherein said advertisement-content delivering apparatus collects determination results of a plurality of display apparatuses in respective cars of the train and totalizes the result, wherein the display inserts, halfway in reproduction of the advertisement content, a video for a short time unrecognizable by a passenger for display state check used in a determining operation for a display result as a checking video, and wherein the processor performs the determination using a photographing result of the checking-video.

2. The in-train information display apparatus according to claim 1, wherein the in-train information display apparatus stores, in advance, reference information for display result determination, which is color-related information of a specific video screen for the video of advertisement content, calculated based on an image obtained by photographing a normal display screen for the video of advertisement content, and the processor calculates color-related information of the specific video screen based on the image of the specific video screen photographed by the camera and compares the calculated color-related information and the reference information for display result determination to perform the determination.

3. The in-train information display apparatus according to claim 1, wherein the in-train information display apparatus stores in advance, as reference information for display result determination, a magnitude relation among color-related information in regions, which are formed by dividing a specific video screen for the video of advertisement content into a plurality of regions, calculated based on an image obtained by photographing a normal display screen for the video of advertisement content, and the processor calculates, based on an image of the specific video screen photographed by the camera, color-related information in the regions, which are formed by dividing the specific video screen into a plurality of regions, respectively under the same condition as that under which the reference information for display result determination is calculated and compares the calculated magnitude relation among the color-related information and the reference information for display result determination to perform the determination.

4. The in-train information display apparatus according to claim 1, wherein the processor calculates, based on data of the video of advertisement content, color-related information of a screen displayed on the display at a point when the photographing is performed by the camera and sets the color-related information as the reference information for display result determination, further calculates color-related information of the video screen based on an image photographed by the camera, and compares the reference information for display result determination and the color-related information to perform the determination.

5. The in-train information display apparatus according to claim 1, wherein the processor calculates, based on data of the video of advertisement content, color-related information in regions, which are formed by dividing a specific video screen for the video of advertisement content into a plurality of regions, sets a magnitude relation among the calculated color-related information as reference information for display result determination, further calculates, based on an image photographed by the camera, color-related information in the regions, which are formed by dividing the video screen into a plurality of regions, respectively under the same condition as that under which the reference information for display result determination is calculated and compares the calculated magnitude relation among the color-related information and the reference information for display result determination to perform the determination.

6. The in-train information display apparatus according to claim 1, wherein the processor performs the determination at a period determined based on a cumulative use time of the display.

7. The in-train information display apparatus according to claim 1, wherein the in-train information display apparatus inserts, halfway in reproduction of the video of advertisement content, for a short time unrecognizable by the passenger, a video for display state check used in a determining operation for a display result, and the processor performs the determination using a photographing result of the video for display state check by the camera.

8. The in-train information display apparatus according to claim 1, wherein the in-train information display apparatus is set near doors on the car side surface, the camera photographs a video screen displayed on a display of another in-train information display apparatus set on an opposite side of a side where the camera is set, and the processor determines a display result of the video of advertisement content in said another in-train information display apparatus.

9. An in-train information display system comprising:

a plurality of display apparatuses configured to display, to a passenger, video of advertisement content transmitted from an advertisement-content transmitting apparatus set on a ground side, wherein each display apparatus is located in a car of a train that includes a plurality of cars; and an advertisement-content delivering apparatus configured to store, in advance, the video of advertisement content data used in displaying the video of advertisement content and deliver a part or all of the stored video of advertisement content data to each display apparatus of the plurality of display apparatuses according to a schedule determined in advance, wherein each display apparatus includes:

a display configured to display the video of advertisement content;

a camera configured to photograph a video screen that displays the video of advertisement content on the display;

a processor configured to calculate color-related information, which is information concerning a color for each pixel of the video screen, based on an image of the video screen photographed by the camera and determine, based on the calculated color-related information and reference information for display result determination, which is information concerning a color of the video of advertisement content normally displayed on the display, whether the display of the video of advertisement content has been normally performed, and a transmitter configured to transmit a result of the determination to the advertisement-content delivering apparatus, wherein the display inserts, halfway in reproduction of the advertisement content, a video for a short time unrecognizable by the passenger for display state check used in a determining operation for a display result as a checking-video, wherein the processor performs the determination using a photographing result of the checking-video, and wherein the advertisement-content delivering apparatus includes a display-achievement totalizing unit configured to (i) collect determination results received from the display apparatus of each car of the train and (i) totalize display achievements of the video of advertisement contents of each car of the plurality of cars of the train.

10. The in-train information display system according to claim 9, wherein the in-train information display system stores, in advance, in the display apparatus or the advertisement-content delivering apparatus, reference information for display result determination, which is color-related information of a specific video screen for the video of advertisement content, calculated based on an image obtained by photographing a normal display screen for the video of advertisement content, and the processor calculates color-related information of the specific video screen based on the image of the specific video screen photographed by the camera and compares the calculated color-related information and the reference information for display result determination to perform the determination.

11. The in-train information display system according to claim 9, wherein the in-train information display system stores, in advance, in the display apparatus or the advertisement-content delivering apparatus, as reference information for display result determination, a magnitude relation among color-related information in regions, which are formed by dividing a specific video screen for the video of advertisement content into a plurality of regions, calculated based on an image obtained by photographing a normal display screen for the video of advertisement content, and the processor calculates, based on an image of the specific video screen photographed by the camera, color-related information in the regions, which are formed by dividing the specific video screen into a plurality of regions, respectively under the same condition as that under which the reference information for display result determination has been calculated and compares the calculated magnitude relation among the color-related information and the reference information for display result determination to perform the determination.

12. The in-train information display system according to claim 9, wherein the processor calculates, based on data of the video of advertisement content, color-related information of a screen displayed on the display at a point when the photographing is performed by the camera and sets the color-related information as the reference information for display result determination, further calculates color-related information of the video screen based on an image photographed by the camera, and compares the reference information for display result determination and the color-related information to perform the determination.

13. The in-train information display system according to claim 9, wherein the processor calculates, based on the data of the video of advertisement content, color-related information in regions, which are formed by dividing a specific video screen for the video of advertisement content into a plurality of regions, sets a magnitude relation among the calculated color-related information as reference information for display result determination, further calculates, based on an image photographed by the camera, color-related information in the regions, which are formed by dividing the video screen into a plurality of regions, respectively under the same condition as that under which the reference information for display result determination has been calculated and compares the calculated magnitude relation among the color-related information and the reference information for display result determination to perform the determination.

14. The in-train information display system according to claim 9, wherein the processor determines, based on video of advertisement content data delivered from the advertisement-content delivering apparatus and the video advertisement content data stored in the advertisement-content delivering apparatus, whether delivery of video of advertisement content has been normally performed and, when the delivery of the video of advertisement content has been normally performed, executes display result determination processing for the video of advertisement content.

15. The in-train information display system according to claim 9, wherein the display apparatus further includes a failure detecting unit configured to perform failure detection for the display, and the processor executes display result determination processing for the video of advertisement content in a state in which a failure of the display is not detected by the failure detecting unit.

16. An advertisement display result determining method for determining a display result of video of advertisement content in an in-train information display apparatus that displays, to a passenger, the video of advertisement content delivered from an advertisement-content delivering apparatus, the advertisement display result determining method comprising:

a step of photographing, with a camera, a video screen for the video of advertisement content, which is displayed on the display and actually seen from the passenger;

a color-related information calculating step of calculating, by a processor, color-related information, which is information concerning a color for each pixel of the video screen, based on the photographed image of the video screen; and a display-result determining step of determining, by the processor, based on the calculated color-related information and reference information for display result determination, which is information concerning a color of the video of advertisement content normally displayed on the display, whether the display of the video of advertisement content has been normally performed; and a transmitting step of transmitting, by a transmitter, a result of the determination to the advertisement-content delivering apparatus, wherein said advertisement-content delivering apparatus collects determination results of a plurality of display apparatuses in respective cars of the train and totalizes the results, wherein the display inserts, halfway in reproduction of the advertisement content, a video for a short time unrecognizable by the passenger for display state check used in a determining operation for a display result as a checking-video, and the processor performs the determination using a photographing result of the checking-video.

17. The in-train information display apparatus according to claim 1, wherein the in-train information display apparatus stores, in advance, reference information for display result determination, which is color-related information of a specific video screen, calculated based on an image obtained by photographing a normal display screen of the video of advertisement content, and the processor calculates color-related information of the specific video screen on the basis of an image of the specific video screen photographed by the camera, compares the calculated color-related information and the reference information for display result determination to perform the determination, and transmits a result of the determination to the advertisement-content delivering apparatus as information for calculating a number of times of reproduction execution and a number of times of reproduction success for each video of advertisement content.

* * * * *